United States Patent
Macpherson et al.

(10) Patent No.: US 6,577,473 B1
(45) Date of Patent: Jun. 10, 2003

(54) DISC DRIVE RAMP THAT ACCOMODATES SHIPPING COMB

(75) Inventors: Aaron Steve Macpherson, Fort Collins, CO (US); Robert A. Alt, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 52 days.

(21) Appl. No.: 09/586,086

(22) Filed: Jun. 2, 2000

Related U.S. Application Data

(60) Provisional application No. 60/137,756, filed on Jun. 4, 1999.

(51) Int. Cl.[7] ............................................. G11B 21/22
(52) U.S. Cl. ..................................................... 360/254.7
(58) Field of Search ........................... 360/254.7, 254.8, 360/255.6, 255.7

(56) References Cited

U.S. PATENT DOCUMENTS

| | | |
|---|---|---|
| 4,862,584 A | 9/1989 | Budy et al. |
| 4,933,785 A | 6/1990 | Morehouse et al. |
| 5,027,241 A * | 6/1991 | Hatch et al. |
| 5,150,512 A | 9/1992 | Hatchett et al. |
| 5,404,636 A | 4/1995 | Stefansky et al. |
| 5,471,733 A | 12/1995 | Bernett et al. |
| 5,692,289 A | 12/1997 | Amada et al. |
| 5,826,325 A | 10/1998 | Price et al. |
| 5,842,270 A | 12/1998 | Tucker et al. |
| 5,943,761 A | 8/1999 | Tucker et al. |
| 6,032,352 A | 3/2000 | Furay et al. |
| 6,243,222 B1 * | 6/2001 | Boutaghou et al. ...... 360/254.7 |

* cited by examiner

Primary Examiner—Craig A. Renner
(74) Attorney, Agent, or Firm—Jennifer Buenzow

(57) ABSTRACT

A method of assembling disc drive components involving the use of a shipping comb to deliver one or more head gimbal assemblies to a ramp in a disc drive. The shipping comb is configured to engage the head gimbal assembly by its load beam. The load beam is part of a head gimbal assembly which includes a suspension such that the load beam extends from the head gimbal assembly away from the suspension. In the assembly process, a proximal end of the shipping comb is brought into abutment with a distal end of the ramp. The shipping comb may have first features at its proximal end which are configured for mating with second features at the distal end of the ramp.

6 Claims, 3 Drawing Sheets

DISC DRIVE RAMP THAT ACCOMODATES SHIPPING COMB

This patent application claims priority from U.S. Provisional Application No. 60/137,756, filed Jun. 4, 1999.

FIELD OF INVENTION

This invention relates to disc drives, and in particular to the assembly of a head gimbal assembly to a disc drive.

BACKGROUND

A disc drive is more likely to be exposed to large mechanical shock loads when it is not in operation. For example, in portable applications, disc drives may sometimes be dropped. In such situations, the impact of the read/write heads against the discs may cause irreparable damage. One way of preventing such damage is to park the read/write heads off the discs when the disc drive is not in use, as opposed to parking the read/write heads directly on the surfaces of the discs. When the disc drive is in operation, the read/write heads may be found in flight above the disc surfaces.

Each read/write head is often mounted to a slider which is attached to one end of a suspension by gimbals. A flex circuit is usually routed from the read/write heads and along a surface of the suspension. This assembly is referred to as the head gimbal assembly (HGA).

The other end of the suspension is operably connected to an actuator for moving the HGA. When the disc drive stops operating, the actuator moves the read/write heads away from above the disc surface until the HGA comes to rest on a ramp in a process referred to as "unloading". At the start of disc drive operations, in a process referred to as "loading", the actuator moves the HGA away from the ramp towards the discs, thereby bringing the read/write heads into flight above the respective spinning disc. One example of a disc drive incorporating a ramp design is described in the U.S. Pat. No. 4,933,785 issued Jun. 12, 1990, to Morehouse, et al. U.S. Pat. No. 6,032,352 issued Mar. 7, 2000 to Furay, et al., describes an actuator supporting a suspension which has a lift tab attached to one side of the suspension. One end of the load lift tab extends beyond the read/write head to rest on the ramp when it is in the "unloaded" position.

In the manufacture of disc drives with a ramp design, the HGA has to be put into an "unloaded" position, with the HGA resting on the ramp. The assembly is complicated by the fact that a typical disc drive includes more than one disc and that there will be at least one read/write head for reading from or writing to each disc surface. A typical disc drive therefore has an array of read/write heads, arranged in opposing pairs. To minimize the overall size of the disc drive, the spacing between neighboring discs is kept as small as possible. In addition, to facilitate low fly-height, the suspension is pre-loaded to bias the read/write heads towards the disc surface. The opposing pairs of read/write heads must therefore be forcibly held apart from one another when not in flight. For this purpose, a shipping comb formed of an array of pins or teeth may be inserted at the suspensions to keep the read/write heads spaced apart before the HGA is delivered to the ramp. Because the flex circuit can be routed along the surface of the suspension adjacent to the head, the conventional shipping comb tends to rub against the flex circuit, which may possibly damage the flex circuit.

There remains therefore a need for an improved method and apparatus for delivering the HGA to the ramp in the manufacture of disc drives. As described in the following, the present invention provides this and other advantages over the prior art.

SUMMARY OF INVENTION

The present invention provides for an improved method of assembling a disc drive. According to one embodiment of the present invention, the method involves the use of a shipping comb which is configured for engagement with the load beam of a head gimbal assembly. The method involves the use of a ramp which is arranged and configured for engagement with the load beam.

In one preferred embodiment, the load beam is transferred from the shipping comb to the ramp when the teeth of the shipping comb is brought into abutment with the ramp. In a most preferred embodiment, the shipping comb and the ramp are brought into self-alignment by first features on the shipping comb and complementary second features on the ramp.

In another aspect, the present invention provides for a shipping comb which is configured to receive an array of load beams. Each load beam extends beyond a head gimbal assembly away from the suspension. Preferably, the shipping comb is configured for self-alignment with a ramp. In one embodiment, the shipping comb includes first features complementary to second features of the ramp. Preferably, the first features are at a proximal end of at least one shipping comb tooth, and the second features are at a distal end of at least one corresponding ramp tooth.

DETAILED DESCRIPTION

Figure 1:
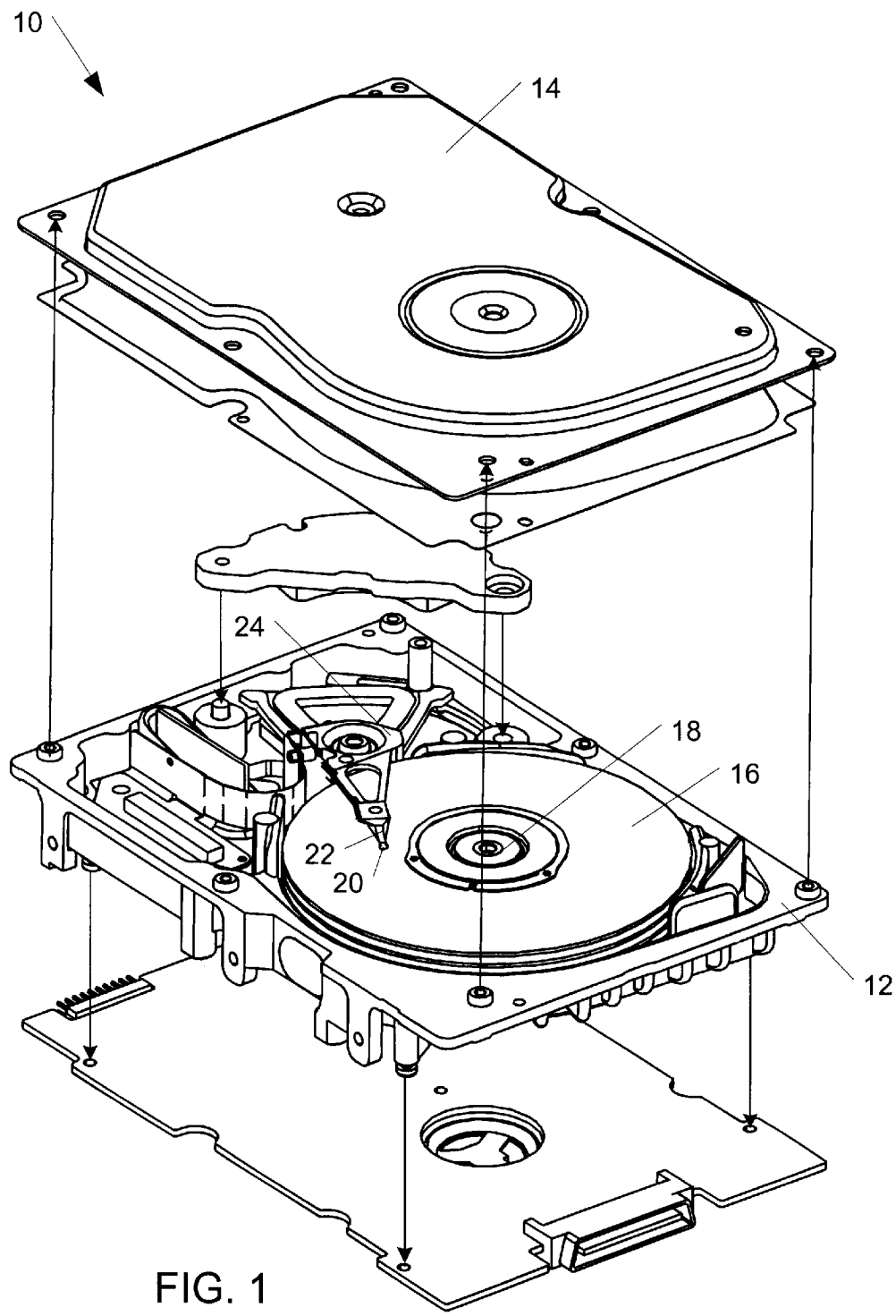
FIG. 1 is a perspective view of a disc drive.

FIG. 1 shows an exemplary disc drive 10. A base 12 and a cover 14 forms an enclosure for the various components in the disc drive. Data is usually stored in concentric tracks on the surfaces of a disc 16 which is mounted to a spindle motor 18 so that the disc can be rotated. If more than one disc is used, the discs are mounted co-axially on the spindle motor. At least one read/write head 20 is supported on one end of a suspension 22 and the other end of the suspension is operably connected to an actuator 24 for moving the read/write heads to the desired positions.

Figure 2:
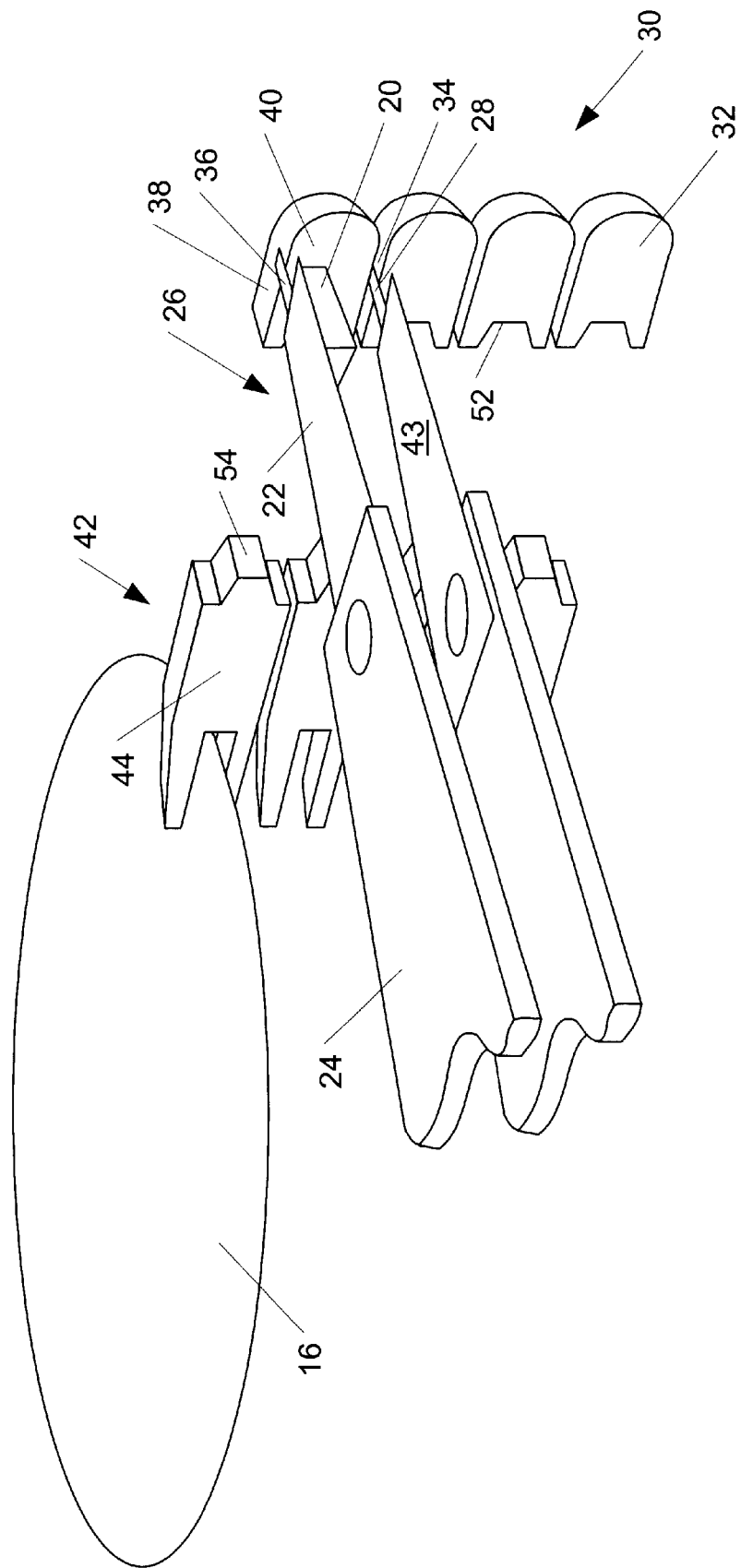
FIG. 2 is a schematic diagram of two head gimbal assemblies engaged by a shipping comb.

A most preferred embodiment of the present invention which can be used in conjunction with a head gimbal assembly (HGA) 26 is shown in FIG. 2. The HGA is configured with a load beam 28 extending from the suspension beyond each read/write head such that a force applied in a direction generally perpendicular to a flat surface of the suspension can be used to hold apart the read/write heads of neighboring HGAs. For clarity, the lower HGA is shown without the read/write head. The load beams are engaged with a shipping comb 30 such that the opposing pairs of read/write heads are held apart from one another. The shipping comb is provided with comb teeth 32. Each recess 34 formed by two neighboring comb teeth is configured to receive a load beam. The top-most load beam 36 is shown to rest against an upper side 38 of the top-most comb tooth 40. The top-most load beam and the lower-most load beam in an array of HGAs may therefore be engaged by the shipping comb in an alternative manner, other than being held in a recess of the shipping comb. In this manner, the read/write heads can be held apart before delivery to the ramp 42 without risking damage to the flex circuits that are routed on the surfaces 43 of the suspensions.

Figure 3:
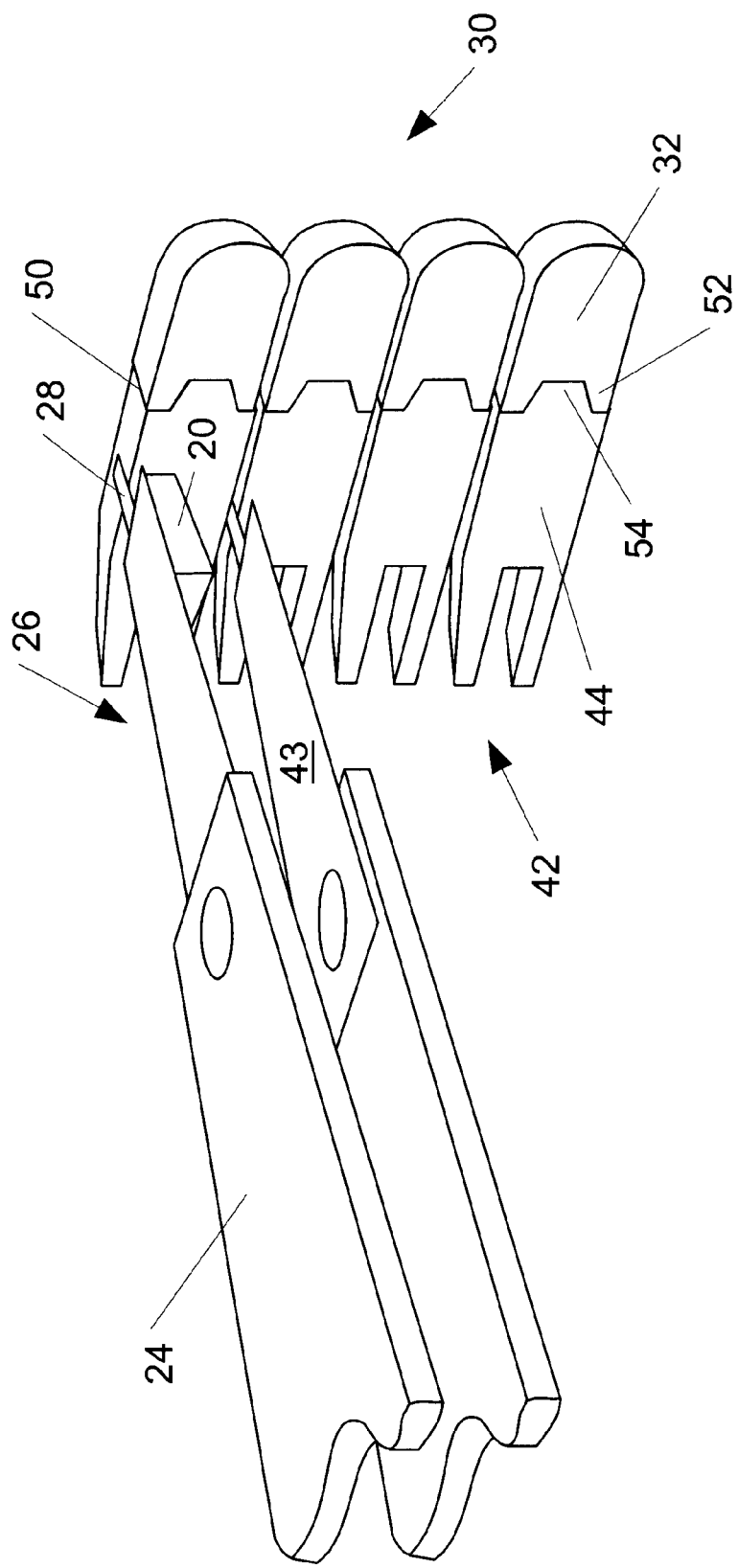
FIG. 3 is a schematic diagram of the shipping comb of FIG. 2 in mating engagement with a ramp.

As shown in FIG. 2, the HGA is mounted to the disc drive with the shipping comb still in assembly with the HGA. According to the present invention, the ramp is located further away from the actuator than is commonly found in a disc drive, such that the HGA will come to rest on the ramp at the load beam and not at the suspension. The ramp is provided with an array of ramp teeth 44 corresponding in number to the comb teeth. Each ramp tooth is configured with one end 54 or surface facing away from the discs which for convenience is referred to here as the distal end. The end or the surface of each comb tooth that is nearest to the discs is referred to here as the proximal end 52 for convenience. The disc drive components are arranged such that, as the HGA is delivered to the ramp, each proximal end of the comb teeth comes into abutment with each distal end of the ramp teeth as illustrated in FIG. 3. The load beams can then be transferred from the shipping comb to the ramp, for example, by sliding the load beam across a seam 50 formed by a shipping comb tooth and a corresponding ramp tooth.

Preferably, the proximal end of each comb tooth is configured to complement the corresponding distal end of the ramp teeth. Whilst in the conventional designs the shipping comb has to be positioned so that it does not interfere with the ramp, the present invention provides for self-alignment and facilitates the delivery of the HGA to the desired unloaded position by having the shipping comb and the ramp configured to mate. A variety of shapes and configurations can be applied to achieve the self-alignment effect. According to a preferred embodiment, each shipping comb tooth has first features 52 in the form of its proximal end being shaped like a dovetail. Second features 54 are found on each ramp tooth 44 in the form of the distal end of the ramp tooth being shaped in a complementary tapered shape.

To maximize the number of discs that can fit inside the enclosure, the distance between neighboring discs is usually kept as small as possible. Furthermore, as there is usually very little spare room in the disc drive, it is difficult to remove the conventional shipping comb even though the HGA has been delivered to the ramp. In contrast, the unconventional position of the shipping comb in the present invention facilitates the removal of the comb after the heads have been moved to the ramp. The comb can therefore by re-used in another assembly process.

Alternatively, preferred embodiments of the invention may be described as follows:

A method of assembling disc drive components involves the use of a shipping comb 30 to engage a load beam 28. The load beam 28 is part of a head gimbal assembly 26 which includes a suspension 22 such that the load beam 28 extends from the head gimbal assembly 26 away from the suspension 22. The method may further include disengaging the load beam 28 from the shipping comb 30 and engaging the load beam 28 to a ramp 42. Preferably, the shipping comb 30 is brought into abutment with the ramp 42. In a preferred embodiment, the method involves bringing a proximal end 52 of the shipping comb 30 into abutment with a distal end 54 of the ramp 42. In a most preferred embodiment, the method includes mating first features 52 on the shipping comb with complementary second features 54 on the ramp.

A shipping comb 30, which can be used for delivering at least one head gimbal assembly 26 to a ramp 42 in a disc drive 10, has at least one tooth 32 which is configured to engage a load beam 28. One load beam 28 extends from each head gimbal assembly 26 away from the suspension 22. The ramp 42 has a distal end 54 which faces away from the disc, or discs, 16 in the disc drive 10. The shipping comb 30 has a proximal end 52 which is formed by one or more teeth 32. Preferably, the proximal end 52 of the shipping comb 30 is configured to abut the distal end 54 of the ramp 42. The shipping comb 30 may have first features at its proximal end 52 which are configured for mating with second features at the distal end 54 of the ramp 42.

The present invention is not limited to the configurations described above, which is only given for the purpose of illustration. It will be understood by those skilled in the art that the foregoing description merely illustrates preferred embodiments and that modifications and changes can be made to the embodiments without departing from the scope of the present invention. For example, the shape and configuration of the first features and the second features may be varied to suit the desired thickness and size of the shipping comb and the ramp. The abutment or mating between the shipping comb and the ramp has been described in respect of the proximal end of the shipping comb and the distal end of the ramp. This does not exclude modifications in which the ends are not generally perpendicular to the HGAs. In addition, the attachment of the shipping comb to the actuator for support is not shown as it is easily understood by person skilled in the art to provide the necessary framework for the desired attachment.

What is claimed is:

1. In a disc drive under assembly comprising:
   a head gimbal assembly having a load beam;
   a shipping comb bearing the load beam, the shipping comb further including a proximal end;
   and a ramp having a distal end which abuts against the proximal end of the shipping comb.

2. The disc drive of claim 1, the shipping comb further including first features at the proximal end configured for mating with second features at the distal end of the ramp.

3. The disc drive of claim 2 in which the first features and the second features are complementarily shaped.

4. The disc drive of claim 2 in which the second features include a tapered shape.

5. The disc drive of claim 4 in which the first features include a dovetail shape.

6. The disc drive of claim 1 in which the load beam is configured for transfer from an engagement with the shipping comb to an engagement with the ramp upon abutment of the distal end of the ramp with the proximal end of the shipping comb.

* * * * *